(12) United States Patent
Zebian

(10) Patent No.: US 10,480,412 B2
(45) Date of Patent: Nov. 19, 2019

(54) STRUCTURE ENSURING ATTENUATION OF ACOUSTIC WAVES AND THERMAL EXCHANGE

(71) Applicant: AIRBUS OPERATIONS (S.A.S.), Toulouse (FR)

(72) Inventor: Maxime Zebian, Saint Sauveur (FR)

(73) Assignee: Airbus Operations (S.A.S.), Toulouse (FR)

( * ) Notice: Subject to any disclaimer, the term of this patent is extended or adjusted under 35 U.S.C. 154(b) by 298 days.

(21) Appl. No.: 15/583,902

(22) Filed: May 1, 2017

(65) Prior Publication Data

US 2017/0321603 A1 Nov. 9, 2017

(30) Foreign Application Priority Data

May 3, 2016 (FR) ...................................... 16 53992

(51) Int. Cl.
| | |
|---|---|
| *F02C 7/045* | (2006.01) |
| *F02K 1/82* | (2006.01) |
| *F02K 3/115* | (2006.01) |
| *F02C 7/18* | (2006.01) |
| *B64C 21/02* | (2006.01) |
| *B64D 33/02* | (2006.01) |

(52) U.S. Cl.
CPC .............. *F02C 7/045* (2013.01); *B64C 21/02* (2013.01); *B64D 33/02* (2013.01); *F02C 7/18* (2013.01); *F02K 1/827* (2013.01); *F02K 3/115* (2013.01); *B64C 2230/14* (2013.01); *B64D 2033/024* (2013.01); *B64D 2033/0206* (2013.01); *F05D 2260/213* (2013.01); *F05D 2260/96* (2013.01); *Y02T 50/675* (2013.01)

(58) Field of Classification Search
CPC .................................. F02C 7/045; F02C 7/047
USPC ........................................... 181/214; 165/185
See application file for complete search history.

(56) References Cited

U.S. PATENT DOCUMENTS

| 8,172,037 B2 | 5/2012 | Porte et al. | |
|---|---|---|---|
| 8,733,501 B2 * | 5/2014 | Porte ....................... | F02K 1/827 181/292 |
| 2010/0096213 A1 * | 4/2010 | Frustie ................... | B64D 33/02 181/214 |

(Continued)

FOREIGN PATENT DOCUMENTS

| FR | 2917067 A1 | 12/2008 |
|---|---|---|
| FR | 2983835 A1 | 6/2013 |
| GB | 2476855 A | 7/2011 |

OTHER PUBLICATIONS

French Search Report for Application No. 1653992 dated Jan. 18, 2017.

*Primary Examiner* — Forrest M Phillips
(74) *Attorney, Agent, or Firm* — Jenkins, Wilson, Taylor & Hunt, P.A.

(57) ABSTRACT

A structure ensuring acoustic attenuation of a flow of a first fluid and heat exchange between a first fluid and a second fluid. The structure includes a first wall which is perforated, a second wall, and a plurality of intermediate walls extending between the first wall and the second wall. For each intermediate wall, there is a pipe intended to receive the second fluid and inscribed within the intermediate wall. Such a structure makes it possible to optimally integrate the acoustic wave attenuation function and the heat exchange function.

18 Claims, 3 Drawing Sheets

(56) References Cited

U.S. PATENT DOCUMENTS

2014/0027102 A1   1/2014   Antel, Jr. et al.
2015/0342092 A1*  11/2015  Ramm .................... F28F 3/022
                                                      165/185

* cited by examiner

STRUCTURE ENSURING ATTENUATION OF ACOUSTIC WAVES AND THERMAL EXCHANGE

CROSS-REFERENCE TO RELATED APPLICATION

This patent application claims priority to French patent application FR 16 53992, filed on May 5, 2016, the entire disclosure of which is incorporated by reference herein.

TECHNICAL FIELD

The present disclosure relates to a structure ensuring attenuation of acoustic waves generated by the flow of a first fluid and also allowing heat exchange between the first fluid and a second fluid, as well as an aircraft having such a structure.

BACKGROUND

A turbine engine of an aircraft, in particular a dual-flow turbine engine, has an air duct that opens to the front and through which fresh air enters the turbo engine. The air duct is defined by inner walls, which channel the air. Part of the air is used to perform heat exchange with the fluids of the aircraft. To this end, heat exchangers are implemented on the inner walls.

The interior of the duct is also lined with structures attenuating acoustic waves generated by the flow of air in the air duct and thereby enabling attenuation of turbo engine noise. Such structures generally comprise a perforated wall that is oriented toward the inside of the duct and at the back of which is particularly arranged a set of honeycomb-shaped cavities. The cavities form quarter wave resonators which attenuate a specific frequency.

An implementation of heat exchangers on the inner walls of the duct reduces the space allocated to the acoustic structures which may result in an increase in turbo engine noise.

SUMMARY

A purpose of the present disclosure is to disclose a structure that attenuates acoustic waves generated by the flow of a first fluid and provides a thermal exchange between this first fluid and a second fluid.

In relation thereto, a structure is disclosed providing acoustic attenuation of a flow of a first fluid and heat exchange between the first fluid and a second fluid, the structure having:
- a first wall which is perforated;
- a second wall;
- a plurality of intermediate walls extending between the first wall and the second wall; and
- for each intermediate wall, a pipe intended to receive the second fluid and inscribed or defined within the intermediate wall.

Such a structure makes it possible to optimally integrate the acoustic wave attenuation function and the heat exchange function.

According to a particular embodiment, each pipe has an elliptical profile.

Advantageously, the pipe is located at a distance from both the first wall and the second wall.

According to an embodiment, the intermediate wall takes the form of a double wall consisting of or comprising two parallel walls between the first wall and the second wall and separated by a free space forming the pipe.

Advantageously, the intermediate wall has a dividing wall which extends between the two walls of the intermediate wall and defines, at the first wall, a chamber separated from the pipe by the dividing wall.

Advantageously, the structure comprises a partition wall integral with the intermediate wall and extending inside the pipe to separate the duct into two sub-pipes.

Advantageously, the partition wall is a corrugated plate.

Advantageously, the partition wall has through holes connecting both sides of the partition wall.

According to a variant, each wall forming the intermediate wall has a part which extends beyond the first wall.

According to another variant, each partition wall has a part that extends beyond the first wall.

According to another variant, the structure has fins that extend along the first wall on the side opposite the pipes; each fin extends perpendicularly to the partition walls, and each fin is integral with the partition walls along which it is in contact.

According to another variant, the structure has fins that extend along the first wall on the side opposite the pipes; each fin extends perpendicularly to the intermediate walls and is integral with the first wall.

The disclosure herein also proposes an aircraft having a pod with an inner wall defining an air duct and where the inner wall is made up of structures according to one of the preceding variants, where the first wall is oriented toward the inside of the duct.

BRIEF DESCRIPTION OF DRAWINGS

Characteristics of the disclosure herein mentioned above, and other characteristics, will become more apparent from the following description of an embodiment, the description given with reference to the enclosed example figures, which include.

DETAILED DESCRIPTION

Figure 1:
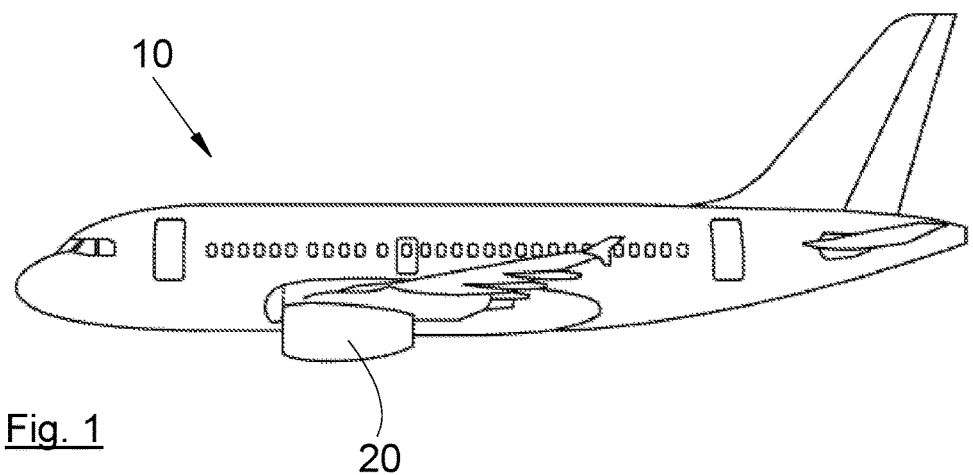
FIG. 1 shows a side view of a aircraft according to the disclosure herein.

FIG. 1 shows an aircraft 10 which has a pod 20 inside of which is arranged a turbo engine. The inner wall of the pod 20 defines an air duct which passes through the turbo engine. Each of FIGS. 2 through 6 shows a structure that provides acoustic attenuation of a first fluid flowing along this structure and, heat exchange between the first fluid and a second fluid circulating inside of this structure.

In the description that follows, each structure is described as forming part of an inner wall of a pod 20 of an aircraft 10, but it can be used in another environment where it is necessary to attenuate the noise generated by the flow of a first fluid and to provide heat exchange between the first fluid and the second fluid.

Figure 2:
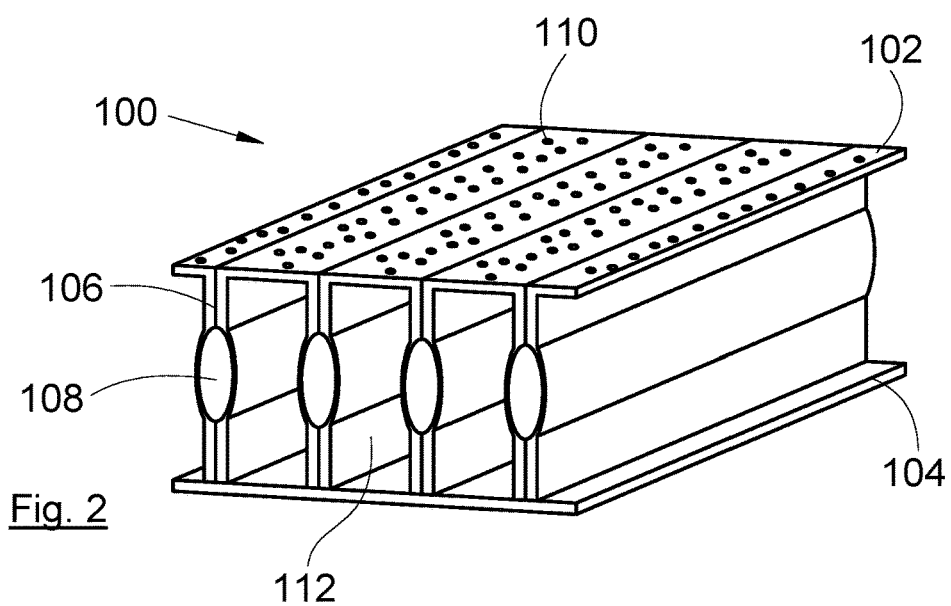
FIG. 2 shows a perspective view of a structure according to a first embodiment of the disclosure herein.

FIG. 2 shows a structure 100 according to a first embodiment structure which has:
- a first wall 102 which is perforated;
- a second wall 104 located at a distance and, here, parallel to the first wall 102;
- a plurality of intermediate walls 106 extending between the first wall 102 and the second wall 104, here extending perpendicularly to the first wall 102 and to the second wall 104; and
- for each intermediate wall 106, a pipe 108 within the intermediate wall 106.

All the intermediate walls 106 are parallel to one another and thus create corridors 112 and the holes 110 in the first wall 102 ensure the passage between the outside of the first wall 102 and corridors 112.

In the case of FIG. 2, the pipes 108 are arranged at a distance from both the first wall 102 and of the second wall 104.

The intermediate walls 106 are made of a material of high thermal conductivity, such as a metallic material for example.

In the case of a flow of the first fluid in a duct, the first wall 102 is oriented toward the inside of the duct. The first fluid, which is here the air of the duct, flows along the first wall 102 and the holes 110 allow part of the air to penetrate into the corridors 112 and thereby attenuate acoustic waves generated by the flow of the air.

A second fluid, which can be oil for example, flows through the pipes 108 and the oil cools by heat exchange with the first fluid through the walls of the pipe 108 and intermediate walls 106.

The fact placing each pipe 108 at a distance from the first wall 102 limits the risks of damage to the pipes in the event of impacts on the first wall 102.

In the embodiment of the disclosure herein presented here, the structure 100 consists of or comprises a plurality of formed sections of substantially rectangular cross-section where the formed sections are secured to one other and where each pipe 108 is encapsulated between the two neighbouring walls of two adjacent formed sections.

The structure can be assembled by all appropriate techniques according to the materials implemented, such as brazing, welding, and bonding from preformed or extruded parts, for example.

The structure 100 ensures cross-current or parallel flow between the first fluid and the second fluid, in either a co-current or a counter-current flow configuration.

Figure 3:
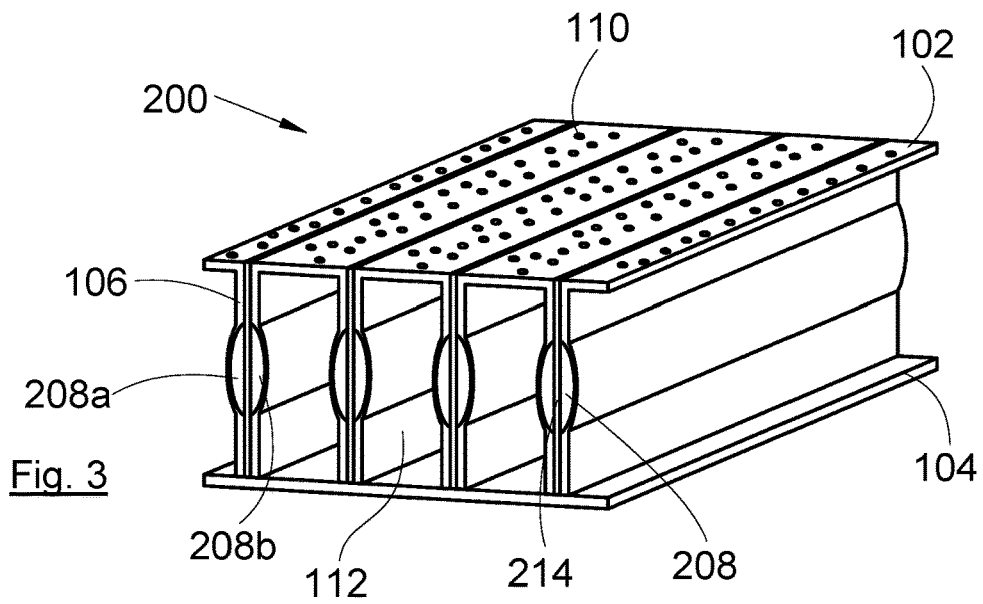
FIG. 3 shows a perspective view of a structure according to a second embodiment of the disclosure herein.

FIG. 3 shows a structure 200 according to a second embodiment that features the same elements as the structure 100 according to the first embodiment except in that the structure 200 has a partition wall 214 that separates each pipe 208 in two sub-pipes 208a-b. The partition wall 214 is also made of a material of high thermal conductivity. The partition wall 214 is integral with the intermediate wall 106 and extends it on the inside of the pipe 208. Such a partition wall 214 improves the heat exchange between the first fluid and the second fluid.

The structure 200 ensures cross-current or parallel flow between the first fluid and the second fluid, in either co-current or counter-current flow configurations.

Figure 4:
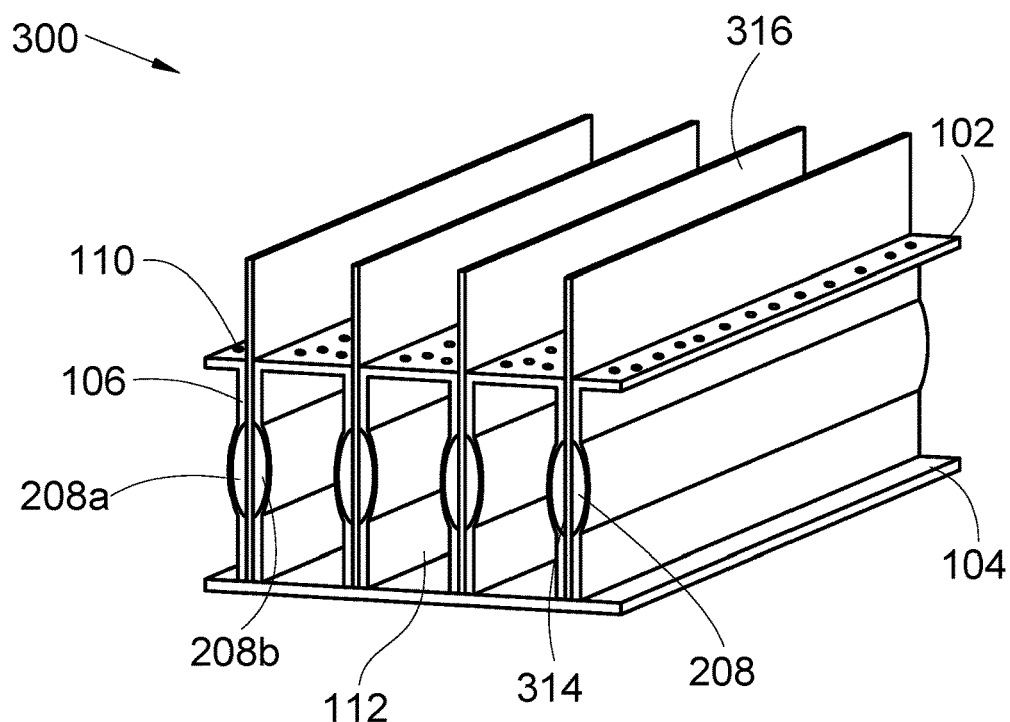
FIG. 4 shows a perspective view of a structure according to a third embodiment of the disclosure herein.

FIG. 4 shows a structure 300 according to a third embodiment having the same elements as the structure 200 according to the second embodiment except in that each partition wall 314 has a part 316 that extends beyond the first wall 102, i.e. inside the duct in order ensure better heat exchange between the first fluid and the second fluid. Each part 316 is thus parallel to the partition wall 314 that it extends and to the pipes 208 of the structure 300. The structure 300 ensures cross-current or parallel flow between the first fluid and the second fluid, in either co-current or counter-current flow configurations.

Figure 5:
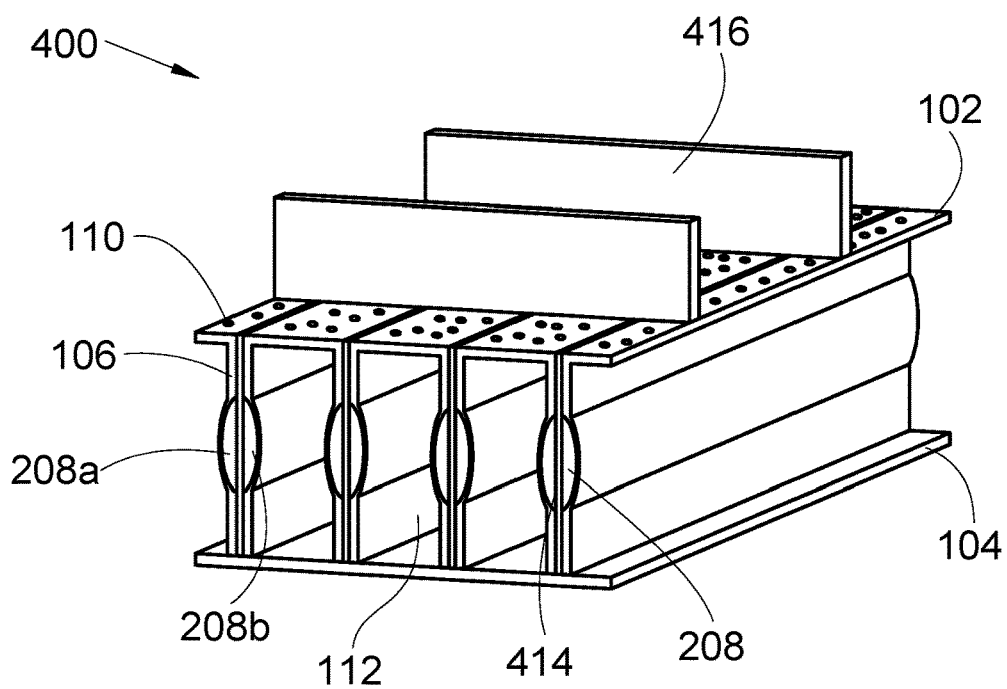
FIG. 5 shows a perspective view of a structure according to a fourth embodiment of the disclosure herein.

FIG. 5 shows a structure 400 according to a fourth embodiment having the same elements as the structure 200 according to the second embodiment except that it has fins 416 that extend along the first wall 102 on the side opposite the pipes 208. Each fin 416 is also made of a material of high thermal conductivity. Each fin 416 extends perpendicularly to the separation walls 414 and to the first wall 102, and is integral with the partition walls 414 along which it is in contact. The structure 400 ensures a cross-current flow between the first fluid and the second fluid.

Figure 6:
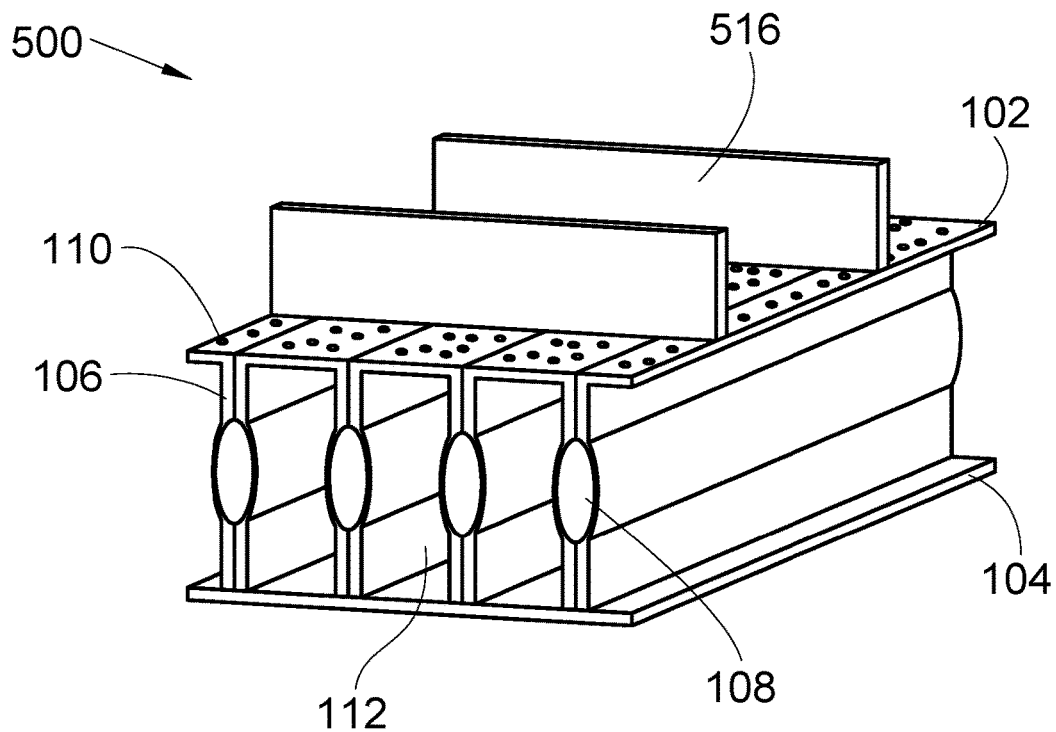
FIG. 6 shows a perspective view of a structure according to a fifth embodiment of the disclosure herein.

FIG. 6 shows a structure 500 according to a fourth embodiment having the same elements as the structure 100 according to the first embodiment except that it has fins 516 that extend along the first wall 102 on the side opposite the pipes 108. Each fin 516 is also made of a material of high thermal conductivity. Each fin 516 extends perpendicularly to the intermediate walls 106 and the first wall 102, and is integral with the first wall 102. The structure 500 ensures a cross-current flow between the first fluid and the second fluid.

In a preferred embodiment, each pipe 108, 208 has an elliptical and non-circular profile, in particular with a ratio between the length of the major axis and the length of the minor axis in the order of 4 to 1. When a partition wall 214, 314, 414 is present, the pipe 208 takes the shape of two half-ellipses 208a and 208b. The elliptical shape increases the useful heat exchange surface area while limiting the surface area that is not acoustically treated.

In the embodiment of the disclosure herein presented in FIGS. 2 through 6, the major axis is perpendicular to the first and second walls 102 and 104.

The intermediate walls 106 are deformed by the presence of the pipes 108 and 208 and these distortions create a narrowing of the corridors 112 at the level of the pipes 108 and 208.

The placement of pipes 108, 208 of elliptical cross-section allows greater fluid flow cross-sections to be obtained in relation to circular cross-sections having the same impact on the acoustic surface treatment, which limits hydraulic head losses.

The elliptic cross-sections also make it possible to boost the heat exchange coefficient particularly when the width of the corridor becomes small in comparison with its height.

The elliptical sections also make it possible to have a heat exchange surface area between the fluid and the intermediate walls 106, and this exchange surface area is further increased when a partition plate is integrated into the pipe.

To increase the contact surface of the fluid in the pipe 208, split into two sub-pipes 208a-b, the partition wall 214, 314, 414 can be a corrugated plate.

Whether the partition wall 214, 314, 414 is corrugated or flat, it can have through holes connecting both sides of the partition wall 214, 314, 414 to ensure better homogenisation of the temperature of the second fluid and participate in the creation of local turbulence increasing the heat exchange coefficient on the side of the second fluid thus the exchange in general.

In the examples illustrated in FIGS. 2 through 6, the pipes 108, 208 are centred at mid-height of the partition walls 106 but moving them towards the first wall 102 helps to minimize the thermal resistance related to the length between the first wall 102 and the walls of the pipes 108, 208.

Figure 7:
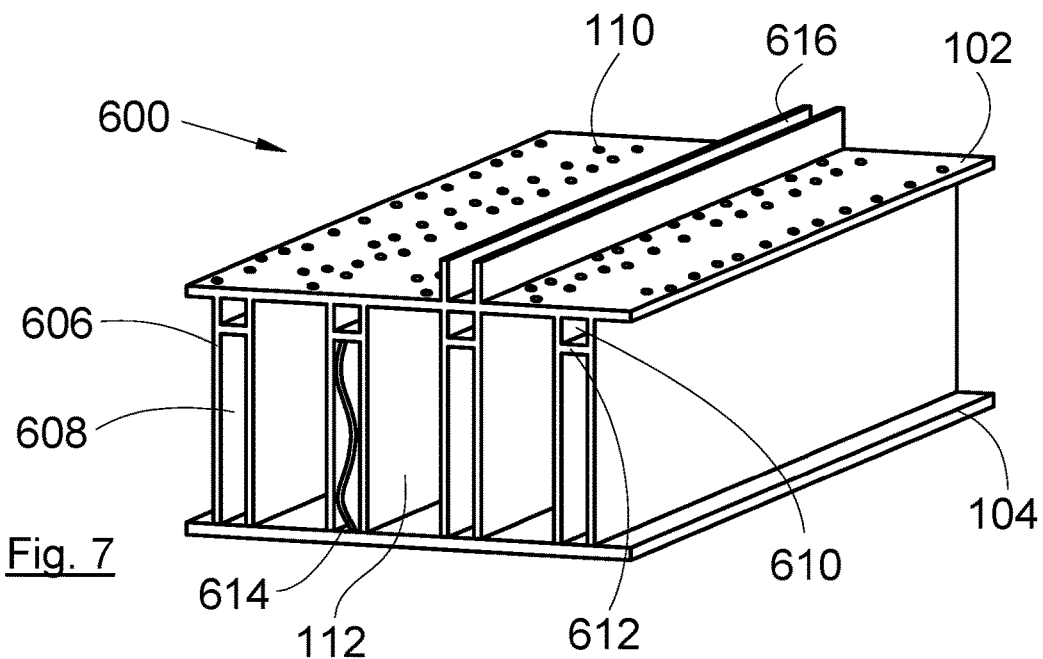
FIG. 7 shows a perspective view of a structure according to a sixth embodiment of the disclosure herein.

FIG. 7 shows a structure 600 according to a fifth embodiment which has:
- a first wall 102 which is perforated;
- a second wall 104;
- a plurality of intermediate walls 606 extending between the first wall 102 and the second wall 104; and
- for each intermediate wall 606, a pipe 608 intended to receive a fluid and inscribed or defined within the intermediate wall 606.

All the intermediate walls 606 are parallel to one another and thus create corridors 112 and the holes 110 in the first wall 102 ensure the passage between the outside of the first wall 102 and corridors 112.

In the case of FIG. 7, the intermediate wall 606 takes the form of a double wall consisting of or comprising two parallel walls extending between the first wall 102 and the second wall 104 and separated by a free space forming the pipe 608. That is to say that the pipe 608 is arranged between the two walls forming the intermediate wall 606.

The intermediate wall 606 has a dividing wall 612 which extends between the two walls of the intermediate wall 606 and defines, at the level of the first wall 102, a chamber 610 separated from the pipe 608 by the dividing wall 612. The pipe 608 is thus separated from the first wall 102 and by the chamber 610 which is filled with air or empty. Thus, in case of very high mechanical loads or in the case of impact, the chamber 610 constitutes a barrier which prevents the first fluid from mixing with the second fluid, by absorbing a part of the deformation energy.

As with the previous embodiments, the structure 600 may have a partition wall 614, possibly corrugated and pierced, integral with the intermediate wall 606 and extending inside the pipe 608 to separate the pipe 608 into two sub-pipes. The partition wall 614 can be corrugated and/or pierced.

The structure 600 can also include fins in accordance with those of the embodiment shown in FIG. 6.

The structure 600 can also have fins 616 which are derived from an extension of the walls forming the intermediate wall 606 beyond the first wall 102. In other words, each wall forming the intermediate wall 606 has a part 616 that extends beyond the first wall 102.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structure for providing acoustic attenuation of a flow of a first fluid flowing along the structure, the structure comprising:
- a first wall, which is perforated by a plurality of holes;
- a second wall;
- a plurality of intermediate walls extending between the first wall and the second wall;
- a plurality of corridors defined between adjacent intermediate walls, the corridors being bounded by the first and second walls; and
- a pipe configured to receive a second fluid, wherein each pipe is oriented along a length of, and inscribed within, one of the plurality of intermediate walls, and wherein the pipe is located a distance from both the first wall and the second wall;
- wherein the structure is configured for a portion of the first flow to penetrate, via the holes formed in the first wall, into the corridors for heat exchange between the portion of the first fluid in the corridors and the second fluid in a corresponding pipe in one of the intermediate walls defining the corridor.

2. The structure according to claim 1, wherein the first fluid is air and the second fluid is oil.

3. The structure according to claim 1, wherein the first flow penetrates directly into each of the corridors via the holes formed in the first wall.

4. The structure according to claim 1, wherein each pipe has an elliptical profile.

5. The structure according to claim 1, comprising a partition wall integral with one or more of the plurality of intermediate walls and extending inside of the pipe and separating the pipe into two sub-pipes.

6. The structure according to claim 5, wherein the partition wall is a corrugated plate.

7. The structure according to claim 5, wherein the partition wall has through holes connecting both sides of the partition wall.

8. An aircraft having a pod, the pod having an inner wall that defines an air duct, an inner wall thereof comprising at least one structure according to claim 1, wherein the first wall is oriented toward an inside of the air duct.

9. A structure for providing acoustic attenuation of a flow of a first fluid flowing along the structure, the structure comprising:
- a first wall, which is perforated by a plurality of holes;
- a second wall;
- a plurality of intermediate walls extending between the first wall and the second wall, wherein one or more of the plurality of intermediate walls is in a form of a double wall comprising two parallel walls that extend between the first wall and the second wall and are separated by a free space forming a pipe configured to receive a second fluid; and
- a plurality of corridors defined between adjacent intermediate walls, the corridors being bounded by the first and second walls;
- wherein each pipe is oriented along a length of, and inscribed within, a corresponding one of the one or more of the plurality of intermediate walls in which the pipe is formed; and
- wherein the structure is configured such for a portion of the first flow to penetrate, via the holes formed in the first wall, into the corridors for heat exchange between the portion of the first fluid in the corridors and the second fluid in a corresponding pipe in one of the intermediate walls defining the corridor.

10. The structure according to claim 9, wherein the intermediate wall has a dividing wall which extends between the two parallel walls of the intermediate wall and which defines, at a level of the first wall, a chamber separated from the pipe by the dividing wall.

11. A structure according to claim 9, comprising a partition wall integral with the one or more intermediate walls, the partition wall extending inside of the pipe and separating the pipe into two sub-pipes.

12. The structure according to claim 11, wherein the partition wall is a corrugated plate.

13. The structure according to claim 11, wherein the partition wall has through holes connecting both sides of the partition wall.

14. The structure according to claim 11, wherein each partition wall has a part that extends beyond the first wall.

15. The structure according to claim 9, wherein each intermediate wall has a part that extends beyond the first wall.

16. The structure according to claim 9, comprising fins that extend along the first wall on a side thereof that is opposite the pipe, wherein each fin extends perpendicularly to the one or more intermediate walls and is integral with the first wall.

17. An aircraft having a pod, the pod having an inner wall that defines an air duct, an inner wall thereof comprising at least one structure according to claim 9, wherein the first wall is oriented toward an inside of the air duct.

18. A structure providing acoustic attenuation of a flow of a first fluid flowing along the structure, the structure comprising:

a first wall, which is perforated by a plurality of holes;
a second wall;
a plurality of intermediate walls extending between the first wall and the second wall, wherein one or more of the plurality of intermediate walls is in a form of a double wall comprising two parallel walls that extend between the first wall and the second wall and are separated by a free space forming a pipe configured to receive a second fluid;
a plurality of corridors defined between adjacent intermediate walls, the corridors being bounded by the first and second walls;
a partition wall integral with one or more of the plurality of intermediate walls and extending inside of the pipe and separating the pipe into two sub-pipes; and
fins that extend along the first wall on a side thereof that is opposite the pipe, wherein each fin extends perpendicularly to the one or more intermediate walls and is integral with the first wall,
wherein each pipe is oriented along a length of, and inscribed within, a corresponding one of the one or more of the plurality of intermediate walls in which the pipe is formed,
wherein each pipe is located a distance from both the first wall and the second wall.

* * * * *